United States Patent
Mitsui et al.

(10) Patent No.: US 8,778,041 B2
(45) Date of Patent: Jul. 15, 2014

(54) EXHAUST GAS TREATMENT DEVICE FOR AN OXYGEN COMBUSTION SYSTEM

(75) Inventors: Yoshiaki Mitsui, Hiroshima (JP); Hidehisa Yoshizako, Hiroshima (JP); Noriyuki Imada, Hiroshima (JP); Naoki Oda, Hiroshima (JP)

(73) Assignee: Babcock-Hitachi Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/509,693

(22) PCT Filed: Nov. 19, 2010

(86) PCT No.: PCT/JP2010/006808
§ 371 (c)(1),
(2), (4) Date: May 14, 2012

(87) PCT Pub. No.: WO2011/064975
PCT Pub. Date: Jun. 3, 2011

(65) Prior Publication Data
US 2012/0272626 A1 Nov. 1, 2012

(30) Foreign Application Priority Data
Nov. 25, 2009 (JP) ................. 2009-267914

(51) Int. Cl.
*B01D 50/00* (2006.01)
*B01D 39/20* (2006.01)
*B01D 39/06* (2006.01)
*B01D 39/14* (2006.01)
*B01D 24/00* (2006.01)
*B01D 53/34* (2006.01)
*F23J 15/08* (2006.01)
*B01D 53/50* (2006.01)
*B01D 53/75* (2006.01)
*F23L 7/00* (2006.01)
*F23J 15/06* (2006.01)
*F23J 15/00* (2006.01)
*F23C 9/00* (2006.01)
*B01D 53/56* (2006.01)
*B01D 53/62* (2006.01)

(52) U.S. Cl.
CPC ........... *F23L 7/007* (2013.01); *B01D 2251/606* (2013.01); *F23J 2219/20* (2013.01); *F23J 2219/70* (2013.01); *B01D 53/343* (2013.01); *F23J 15/08* (2013.01); *B01D 53/346* (2013.01); *Y02E 20/346* (2013.01); *Y02E 20/363* (2013.01); *F23J 2217/10* (2013.01); *B01D 53/56* (2013.01); *B01D 53/62* (2013.01); *F23J 2215/50* (2013.01); *B01D 53/504* (2013.01); *B01D 2251/306* (2013.01); *B01D 53/75* (2013.01); *F23J 2215/20* (2013.01); *B01D 2257/404* (2013.01); *F23J 2217/50* (2013.01); *F23J 15/06* (2013.01); *F23J 15/006* (2013.01); *B01D 2251/404* (2013.01); *B01D 2257/302* (2013.01); *F23C 9/003* (2013.01); *Y02E 20/344* (2013.01); *B01D 2251/304* (2013.01); *B01D 2257/504* (2013.01)
USPC ................. 55/282.3; 55/522; 55/523; 55/524; 422/169; 422/170; 422/171; 422/172; 422/177; 422/178; 422/179; 422/180; 422/181; 422/182

(58) Field of Classification Search
CPC ............. B01D 251/606; B01D 53/343; B01D 53/346; B01D 53/56; B01D 53/62; B01D 53/504; B01D 2251/306; B01D 53/75; B01D 2257/404; B01D 2251/404; B01D 2257/302; B01D 2251/304; B01D 2257/504; F23J 2219/20; F23J 2219/70; F23J 15/08; F23J 2217/10; F23J 2215/50; F23J 2215/20; F23J 2217/50; F23J 15/06; F23J 15/006; F23L 7/007; F23C 9/003; Y02E 20/346; Y02E 20/363; Y02E 20/344
USPC ................. 55/522–524, 282.3; 422/169–172, 422/177–182
See application file for complete search history.

(56) References Cited

U.S. PATENT DOCUMENTS

| | | | |
|---|---|---|---|
| 7,235,220 B2 * | 6/2007 | Honjo et al. | 423/210 |
| 7,622,092 B2 * | 11/2009 | Honjo et al. | 423/210 |
| 7,704,472 B2 * | 4/2010 | Murakami et al. | 423/210 |
| 7,833,501 B2 | 11/2010 | Kobayashi et al. | |
| 8,088,348 B2 * | 1/2012 | Ukai et al. | 423/210 |
| 8,167,975 B2 * | 5/2012 | Shimamura et al. | 95/13 |
| 8,302,388 B2 * | 11/2012 | Kobayashi et al. | 60/298 |
| 2010/0206202 A1 * | 8/2010 | Darde et al. | 110/204 |
| 2011/0014578 A1 * | 1/2011 | Rohde et al. | 431/75 |
| 2011/0076216 A1 * | 3/2011 | Orita et al. | 423/242.1 |
| 2012/0272626 A1 * | 11/2012 | Mitsui et al. | 55/315.2 |

FOREIGN PATENT DOCUMENTS

| | | | |
|---|---|---|---|
| DE | WO2009100881 | * | 8/2009 |
| JP | 58-174222 | | 10/1983 |
| JP | 04-244504 | | 9/1992 |
| JP | 05-231609 | | 9/1993 |
| JP | 07-116465 | | 5/1995 |
| JP | 2000-317260 | | 11/2000 |
| JP | 2001-000833 | | 1/2001 |
| JP | 2007-147161 | | 6/2007 |
| JP | WO2008078721 | * | 7/2008 |

OTHER PUBLICATIONS

International Preliminary Report on Patentability, mail date Jun. 7, 2012 and English Language Translation thereof.

* cited by examiner

*Primary Examiner* — Amber Orlando

(74) *Attorney, Agent, or Firm* — Greenblum & Bernstein P.L.C.

(57) ABSTRACT

In an exhaust gas treatment device provided with: an exhaust gas treatment unit in which an oxygen combustion boiler 1 using coal as fuel, a denitration device 3, an air preheater 4, a dust-collection device 5, a desulfurization device 6, and a carbon dioxide recovery device 8 are sequentially arranged from the upstream side to the downstream side of an exhaust gas duct; and an exhaust gas circulation unit which branches off from the exhaust gas duct at an outlet of the dust-collection device 5 or an outlet of the desulfurization device 6 and through which the exhaust gas is preheated by the air preheater 4 and returned to the oxygen combustion boiler 1, a heat-recovery heat exchanger 13 that adjusts a gas temperature at an inlet of the dust-collection device 5 to be not greater than an acid dew point of $SO_3$ and not lower than a water dew point is provided between the air preheater 4 and the dust-collection device 5, a reheating heat exchanger 13 that adjusts a gas temperature to be not lower than the acid dew point of $SO_3$ is provided in the vicinity of a branch of the exhaust gas circulation unit, adjusting the gas temperature at the inlet of the dust-collection device 4 to be not greater than the acid dew point of $SO_3$ makes it possible to prevent corrosion of pipes in the exhaust gas circulation unit and to avoid a decrease in fluidity or combustibility of the pulverized coal in the pipes in the mill.

5 Claims, 7 Drawing Sheets

EXHAUST GAS TREATMENT DEVICE FOR AN OXYGEN COMBUSTION SYSTEM

FIELD OF THE INVENTION

The present invention relates to an exhaust gas treatment device that removes hazardous components in an exhaust gas of an oxygen combustion system, and more particularly to an exhaust gas treatment device appropriate to avoid corrosion, ash clogging, and others of pipes or fans in an exhaust gas circulation unit by efficiently removing a sulfur trioxide ($SO_3$) by a dust-collection unit.

DESCRIPTION OF THE RELATED ART

In recent years, as one of carbon dioxide ($CO_2$) reduction technologies for a power generator boiler, an oxygen combustion method attracts attention. Since the oxygen combustion method has an exhaust gas composition greatly different from that of a conventional method (an air combustion method), points such as corrosion, ash clogging, and others of pipes or fans in an exhaust gas circulation unit due to an increase in concentration of $SO_3$ must be taken into considerations, and development of an exhaust gas treatment device appropriate for the oxygen combustion method is also an important issue.

FIG. 6 shows a configuration of an exhaust gas treatment device in a conventional oxygen combustion system. The exhaust gas treatment device in FIG. 6 has a configuration that an exhaust gas circulation unit is provided on the upstream side of a desulfurization device.

This exhaust gas treatment device is mainly constituted of an exhaust gas treatment unit in which a mill 19 that pulverizes coal as fuel, a boiler 1 that supplies the coal pulverized by the mill 19, a denitration device 3 that treats a nitrogen oxide in an exhaust gas generated from the boiler 1, an air preheater 4 that heats combustion air used in the boiler 1 by an outlet exhaust gas of the denitration device 3, a dust-collection device 5 that removes smoke dust and others in the exhaust gas discharged from the air preheater 4, a desulfurization device 6 that treats a sulfur oxide in the outlet exhaust gas of the dust-collection device 5, a $CO_2$ recovery device 8 that recovers a carbon dioxide in the outlet exhaust gas of the desulfurization device 6, and others are sequentially arranged from the upstream side to the downstream side of an exhaust gas duct of the boiler 1.

Further, there is also provided an exhaust gas circulation unit constituted of a first circulation line 9 through which the outlet exhaust gas of the dust-collection device 5 is returned to the boiler 1 via the air preheater 4, a second circulation line 20 through which the outlet exhaust gas of the dust-collection device 5 is returned to the mill 19 via the air preheater 4, an oxygen manufacturing device 10 that manufactures oxygen to be supplied to the first circulation line 9 and the second circulation line 20, and others.

The boiler 1 performs oxygen combustion with respect to the coal supplied from the mill 19 to generate the exhaust gas. The oxygen used at this moment is manufactured and supplied by the oxygen manufacturing device 10. Furthermore, the oxygen is supplied, e.g., from an oxygen supply pipe 21 through the first circulation line 9 and from the oxygen supply pipe 22 to the mill 19 through the second circulation line 20. The supplied oxygen is heated together with a circulation gas by the air preheater 4.

Moreover, in the denitration device 3, NOx (a nitrogen oxide) contained in the exhaust gas is decomposed, an exhaust gas temperature is then lowered to 200 to 160° C. by the air preheater 4, and thereafter smoke dust in the exhaust gas is removed by the dust-collection device 5. A flow path branches off, and hence the exhaust gas subjected dust removal by the dust-collection device 5 is supplied to the desulfurization device 6, the first circulation line 9, and the second circulation line 20, respectively.

In the desulfurization device 6, a sulfur dioxide ($SO_2$) in the exhaust gas is removed, and then $CO_2$ in the exhaust gas is recovered by a $CO_2$ recovery device 8. Further, the exhaust gas having passed through the first circulation line 9 from the outlet of the dust-collection device 5 is subjected to pressure rising by an exhaust gas circulation fan 15, and supplied to the boiler 1. Further, the exhaust gas having passed through the second circulation line 20 from the outlet of the dust-collection device 5 is subjected to pressure rising by an exhaust gas circulation fan 18, reheated to 200° C. by the air preheater 4, and then supplied to the mill 19. The mill 19 dries and pulverizes the coal, and the coal is supplied to the boiler 1 together with the supplied gas.

Furthermore, FIG. 7 shows another example of the exhaust gas treatment device in the oxygen combustion system according to the conventional technology. The exhaust gas treatment device shown in FIG. 7 has a configuration in which an exhaust gas circulation unit is provided on the downstream side of a desulfurization device 6.

Like the exhaust gas treatment device depicted in FIG. 6, this exhaust gas treatment device is mainly constituted of an exhaust gas treatment unit in which a mill 19 that pulverizes coal as fuel, a boiler 1 to which the coal pulverized by the mill 19 is supplied, a denitration device 3 that treats a nitrogen oxide in an exhaust gas generated from the boiler 1, an air preheater 4 that heats combustion air used in the boiler 1 with an outlet exhaust gas of the denitration device 3, a dust-collection device 5 that removes smoke dust and others in the exhaust gas discharged from the air preheater 4, a desulfurization device 6 that treats sulfur oxidation in the outlet exhaust gas of the dust-collection device 5, a $CO_2$ recovery device 8 that recovers a carbon dioxide in the outlet exhaust gas of the desulfurization device 6, and others are sequentially arranged from the upstream side to the downstream side of an exhaust gas duct of the boiler 1.

Furthermore, there is also provided an exhaust gas circulation unit constituted of a first circulation line 9 through which the outlet exhaust gas of the desulfurization device 6 is returned to the boiler 1 via the air preheater 4, a second circulation line 20 through which the outlet exhaust gas of the desulfurization device 6 is returned to the mill 19 via the air preheater 4, an oxygen manufacturing device 10 that manufactures oxygen to be supplied to the first circulation line 9 and the second circulation line 20, and others.

The boiler 1 performs oxygen combustion with respect to the coal supplied from the mill 19 to generate the exhaust gas. The oxygen used at this moment is manufactured and supplied by the oxygen manufacturing device 10. Furthermore, the oxygen is supplied, e.g., from an oxygen supply pipe 21 through the first circulation line 9 and from the oxygen supply pipe 22 to the mill 19 through the second circulation line 20. The supplied oxygen is heated together with a circulation gas by the air preheater 4.

Moreover, in the denitration device 3, NOx (a nitrogen oxide) contained in the exhaust gas is decomposed, an exhaust gas temperature is then lowered to 200 to 160° C. by the air preheater 4, and thereafter smoke dust in the exhaust gas is removed by the dust-collection device 5. When the exhaust gas subjected to dust removal by the dust-collection device 5 is supplied to the desulfurization device 6, a sulfur dioxide ($SO_2$) in the exhaust gas is removed.

A flow path branches off, and hence the exhaust gas desulfured by the desulfurization device 6 is supplied to the $CO_2$ recovery device 8, the first circulation line 9, and the second circulation line 20, respectively.

In the $CO_2$ recovery device 8, $CO_2$ in the exhaust gas is removed. Further, the exhaust gas having passed through the first circulation line 9 from the exit of the desulfurization device 6 is subjected to pressure rising by an exhaust gas circulation fan 15 and supplied to the boiler 1. Additionally, the exhaust gas having passed through the second circulation line 20 from the outlet of the desulfurization device 6 is subjected to pressure rising by an exhaust gas circulation fan 18, reheated to 200° C. by the air preheater 4, and then supplied to the mill 19. The mill 19 dries and pulverizes the coal, and the coal is supplied to the boiler 1 together with the supplied gas.

Further, as the oxygen combustion method, the following Patent Document 3 discloses a carbon dioxide collection type coal fired power generation system that burns coal with a mixed gas of pure oxygen and a carbon dioxide and flows back the carbon dioxide remaining after removal of the carbon dioxide and moisture generated by this burning to configure a closed cycle used to burn the coal. When the coal is burned with the mixed gas of pure oxygen and the carbon dioxide, substantially the carbon dioxide alone is thereby generated and used for the closed cycle, oxygen concentration is approximated to that of air to maintain combustion conditions, and hence the carbon dioxide generated by combustion is extracted to the outside of the system and recovered without a $CO_2$ separation device.

Furthermore, as a specific example, there is disclosed a system that burns pulverized coal with a mixed gas of pure oxygen and a carbon dioxide, supplies an exhaust gas produced by burning through a denitration device, a dust-collection device, a desulfurization device, and a condenser, recovers a gas that contains substantially $CO_2$ alone, and returns a part of the gas to a boiler for diluting combustion oxygen.

Moreover, as an exhaust gas treatment device according to the conventional method (the air combustion method), the following Patent Document 1, Patent Document 2 and others disclose a configuration that a heat recovery device is provided between an air preheater and a dust-collection device, a neutralizer such as a calcium carbonate is injected to the upstream side of the air preheater, the neutralizer is reacted with an $SO_3$ gas in an exhaust gas in a high-temperature gas atmosphere to remove the $SO_3$ gas, heat is recovered by the heat recovery device, and then the exhaust gas is passed through the dust-collection device. When the exhaust gas that has passed through the heat recovery device to lower its temperature is supplied to the dust-collection device, a back corona phenomenon that an electrical resistivity of the neutralizer is decreased and the dust scatters without being sufficiently adsorbed is prevented from occurring.

Patent Document 1: Japanese Unexamined Patent Publication No. 2001-833
Patent Document 2: Japanese Unexamined Patent Publication No. 2000-317260
Patent Document 3: Japanese Unexamined Patent Publication No. 4-244504

The conventional technology based on the oxygen combustion method or the configuration disclosed in Patent Document 3 do not pay attention to a fact that $SO_3$ concentration or moisture concentration in the exhaust gas is increased when the coal containing sulfur (S) at high concentration is subjected to oxygen combustion, and hence there is a problem that pipes, fans, and others in the exhaust gas circulation unit corrode. In case of regular air combustion, for example, when coal that a content rate of sulfur in the coal is 0.4 to 2.7% (weight %) is burned, $SO_3$ concentration in the exhaust gas is 12 to 50 ppm, and moisture concentration is approximately 8%. However, in case of oxygen combustion, $SO_3$ concentration is 60 to 250 ppm, moisture concentration is 30%, and hence both the $SO_3$ concentration and the moisture concentration are increased.

FIG. 8 is a view showing acid dew points of $SO_3$ (a sulfuric anhydride) at the time of oxygen combustion and air combustion in comparison. FIG. 8 shows a relationship between an exhaust gas temperature (the acid dew point) and the $SO_3$ concentration.

As described above, the moisture concentration in the oxygen combustion is higher than that in the air combustion. Further, as shown in FIG. 8, in the oxygen combustion, when $SO_3$ concentration is 60 to 250 ppm, the acid dew point of $SO_3$ is as high as 162 to 178° C. In the air combustion, when $SO_3$ concentration is 12 to 50 ppm, the acid dew point of $SO_3$ is 130 to 145° C. Therefore, the acid dew point in the oxygen combustion is higher than that in the air combustion.

Under air preheater outlet temperature conditions in the conventional air combustion technology, a gas temperature in the air preheater and the pipe between the air preheater and the dust-collection device may be lower than 180° C. as the acid dew point of $SO_3$ in the oxygen combustion, there is concern that $SO_3$ mist condenses and clogging with ash occurs, and hence the air preheater outlet temperature must be increased beyond the acid dew point.

Furthermore, when supplying the exhaust gas from the circulation line to the mill, the circulating gas is again heated in the air preheater, a gas temperature at an inlet of the mill is set to 200° C., and the supply is performed, but an outlet gas temperature of the miss after drying and pulverizing the coal is lowered to approximately 90° C. and falls below the acid dew point, and $SO_3$ mist is produced. Therefore, when the $SO_3$ mist condenses and adheres to a mill casing or an outlet pipe, not only the inside of the pipe corrodes, but also the pulverized and dried coal fine powder (an average particle diameter: 50 μm) is agglutinated. When the condensed coal powder is deposited in the pipe, fluidity is inhibited, or combustibility is deteriorated.

According to Patent Document 2 and Patent Document 3, there is disclosed the configuration that the neutralizer such as a calcium carbonate is injected to the upstream side of the air preheater and the $SO_3$ gas and the high-temperature gas are reacted in a high-temperature gas atmosphere to remove the $SO_3$ gas. However, at the time of the oxygen combustion, the $SO_3$ concentration in the exhaust gas is higher than that in the air combustion as described above, an alkaline component alone in coal burnt ash cannot sufficiently neutralize $SO_3$, and the pipe may corrode more as compared with the air combustion.

SUMMARY OF THE INVENTION

It is an object of the present invention to reduce $SO_3$ concentration and moisture concentration in an exhaust gas circulation unit and avoid corrosion of pipes in the exhaust gas circulation unit. Moreover, it is another object of the present invention to avoid not only corrosion in a mill but also a decrease in fluidity or combustibility of pulverized coal in the pipes.

To this end, a heat-recovery heat exchanger is disposed between an air preheater and a dust-collection device, an exhaust gas temperature at an inlet of the dust-collection device is set to be not higher than an acid dew point of $SO_3$ and not lower than a water dew point, a reheating heat exchanger is provided on the upstream side of a circulation line, and the exhaust gas temperature is set to be not lower than the acid dew point of $SO_3$.

Further, to this end, in addition to the above-described configuration, an alkaline additive is supplied to the exhaust gas on the upstream side of the heat-recovery heat exchanger so as to have concentration that causes a reaction or higher concentration equivalent to the $SO_3$ concentration in the exhaust gas.

Furthermore, to this end, in addition to the above-described configuration, a water elimination device is disposed on the upstream side of the reheating heat exchanger provided in the circulation line, and moisture concentration in the exhaust gas is reduced.

Moreover, to this end, a part of the gas in the circulation line in the above-described configuration is supplied to the mill.

Specifically, the problem in the present invention can be solved by the following means.

A first aspect of the invention provides an exhaust gas treatment device for an oxygen combustion system, the exhaust gas treatment device comprising: an exhaust gas treatment unit in which a denitration device that denitrates a nitrogen oxide in an exhaust gas generated from an oxygen combustion boiler using coal as fuel, an air preheater that preheats combustion air of the oxygen combustion boiler with the exhaust gas at an outlet of the denitration device; a dust-collection device that collects smoke dust in the exhaust gas at an outlet of the air preheater, a desulfurization device that desulfurs a sulfur oxide in the exhaust gas at an outlet of the dust-collection device, and a carbon dioxide recovery device that recovers a carbon dioxide in the exhaust gas at an outlet of the desulfurization device are sequentially arranged from the upstream side to the downstream side of an exhaust gas duct; and an exhaust gas circulation unit comprising a circulation line which branches off from the exhaust gas duct at the outlet of the dust-collection device or the outlet of the desulfurization device and through which the exhaust gas is preheated by the air preheater and returned to the oxygen combustion boiler as the combustion air, wherein a heat-recovery heat exchanger that recovers heat from the exhaust gas at the outlet of the air preheater and adjusts an exhaust gas temperature at the inlet of the dust-collection device to be not greater than an acid dew point of $SO_3$ and not lower than a water dew point is provided to the exhaust gas duct between the air preheater and the dust-collection device, and a reheating heat exchanger that exchanges heat with the exhaust gas in the heat-recovery heat exchanger and adjusts a temperature of the exhaust gas in the circulation line to be not lower than the acid dew temperature of $SO_3$ is provided to the circulation line in the vicinity of a branch of exhaust gas circulation unit.

A second aspect of the invention provides the exhaust gas treatment device for an oxygen combustion system according to the first aspect, wherein alkaline additive supplying means for supplying an alkaline additive into the exhaust gas is provided to the exhaust gas duct at the inlet or the outlet of the denitration device on the upstream side of the heat-recovery heat exchanger.

A third aspect of the invention provides the exhaust gas treatment device for an oxygen combustion system according to the second aspect, wherein $SO_3$ concentration measuring means for measuring $SO_3$ concentration in the exhaust gas is provided at the outlet of the denitration device, additive supply adjusting means for adjusting a supply of the additive is provided to the alkaline additive supplying means, and a control device is provided which controls the additive supply adjusting means is provided in such a manner that the supply of the additive from the alkaline additive supplying means has concentration that causes a reaction or higher concentration equivalent to $SO_3$ concentration measured by the $SO_3$ concentration measuring means.

A fourth aspect of the invention provides the exhaust gas treatment device for an oxygen combustion system according to the first aspect, wherein a water elimination device that eliminates moisture in the exhaust gas is provided on the upstream side of the reheating heat exchanger in the vicinity of a branch of the exhaust gas circulation unit.

A fifth aspect of the invention provides the exhaust gas treatment device for an oxygen combustion system according to the first aspect, wherein a mill that supplies coal to the oxygen combustion boiler is provided, and a mill supply exhaust gas line that supplies the exhaust gas on the downstream side of the reheating heat exchanger in the exhaust gas circulation unit to the mill is provided.

According to the present invention, when the heat-recovery heat exchanger is provided between the air preheater and the dust-collection device and the exhaust gas temperature at the inlet of the dust-collection device is set to a temperature equal to or below the acid dew point of $SO_3$, $SO_3$ in the exhaust gas condenses and adheres to ash. According to the conventional technology, since the gas temperature becomes 160° C. in the air preheater and the pipes between the air preheater and the dust-collection device and is lower than 162 to 178° C. which is the acid dew point of $SO_3$, and hence there arises a problem that $SO_3$ mist condenses and clogging with ash occurs but, according to the present invention, setting the exhaust gas temperature at the inlet of the dust-collection device to be not lower than a temperature (70 to 80° C.) of the water dew temperature and not higher than the acid dew point (162 to 178° C.) enables preventing clogging with ash from occurring in the air preheater or the pipes on the upstream side of the heat-recovery heat exchanger. It is to be noted that, since water is generated at the water dew point (approximately 70 to 80° C. at the time of oxygen combustion) or a lower temperature, water is solidified with ash, the heat-recovery heat exchanger or the dust-collection device is closed, and hence the exhaust gas temperature is set to be not lower than the temperature of the water dew point (70 to 80° C.)

$SO_3$ that has adhered to the ash reacts with an alkaline component in the ash to form salt. Further, $SO_3$ that has adhered to the ash is discharged to the outside of the system together with the ash by the dust-collection device. Therefore, an amount of $SO_3$ in the exhaust gas on the downstream side of the dust-collection device, i.e., the exhaust gas in the exhaust gas circulation unit is very small (e.g., 1 ppm or below), and hence corrosion of the pipes, the fans, and others in the exhaust gas circulation unit can be reduced. It is to be noted that, even when $SO_3$ adheres to the heat-recovery heat exchanger or the pipes of the dust-collection device, it is neutralized if alkaline ash is present, and hence corrosion of the pipes can be avoided. If the alkaline component in the ash is insufficient, since the pipes are apt to corrode, the alkaline additive must be supplied as will be described later.

Further, when the reheating heat exchanger is installed on the upstream side of the circulation line and heat recovered by the heat-recovery heat exchanger is used to heat the exhaust gas, a temperature of the exhaust gas can be increased to the acid dew point or a higher temperature. Therefore, the condensation of $SO_3$ in the pipes and the fans in the exhaust gas circulation unit can be avoided, and the corrosion of the pipes and the fans in the exhaust gas circulation unit can be greatly reduced.

Furthermore, when the alkaline additive is supplied to the upstream side of the dust-collection device, $SO_3$ in the exhaust gas reacts with the alkaline component in the ash, the component in the ash is prevented from acidifying, namely, alkalinity of the component in the ash is maintained, whereby the corrosion of the pipes on the downstream side of the dust-collection device or the dust-collection device can be avoided. Moreover, although moisture concentration in the oxygen combustion is higher than that in the air combustion, since installing the water elimination device on the upstream side of the reheating heat exchanger provided on the circulation line enables reducing the moisture concentration in the exhaust gas by the water elimination device, an effect of avoiding condensation of $SO_3$ in the pipes, the fans, and the mill in the exhaust gas circulation unit can be enhanced.

According to the first aspect, the exhaust gas temperature at the inlet of the dust-collection device is set to be not higher than the acid dew point of $SO_3$ and not lower than the water dew point, $SO_3$ in the exhaust gas is thereby condensed, $SO_3$ adhering to the ash is removed by the dust-collection device, and the reheating heat exchanger provided in the circulation line of the exhaust gas circulation unit heats the exhaust gas temperature to the acid dew point of $SO_3$ or a higher temperature, thus avoiding the condensation of $SO_3$ in the pipes in the exhaust gas circulation unit.

According to the invention defined in the second aspect, in addition to the operation of the invention described in the first aspect, when the alkaline additive is supplied into the exhaust gas at the inlet or the outlet of the denitration device on the upstream side of the heat-recovery heat exchanger, $SO_3$ in the exhaust gas reacts with the alkaline component in the ash, and the component in the ash can be prevented from acidifying.

Additionally, according to the invention defined in the third aspect, in addition to the operation of the invention defined in the second aspect, when the alkaline additive is supplied so as to have the concentration that causes a reaction or higher concentration equivalent to the $SO_3$ concentration, the component in the ash can be assuredly maintained in alkaline.

Further, at the time of reheating the exhaust gas by the reheating heat exchanger, when an amount of moisture in the exhaust gas is large, efficiency of reheating the exhaust gas temperature to the acid dew point or a higher temperature by latent heat of water is deteriorated.

However, according to the invention defined in the fourth aspect, in addition to the operation of the invention defined in the first aspect, when the water elimination device is used to eliminate the moisture in the exhaust gas, the reheating efficiency of the reheating heat exchanger can be improved.

Furthermore, according to the invention defined in the fifth aspect, in addition to the operation of the invention defined in the first aspect, since the exhaust gas from which most of $SO_3$ has been removed by the dust-collection device is further reheated to the acid dew point or a higher temperature by the reheating heat exchanger and then supplied to the mill, $SO_3$ is not condensed in the mill or the pipes at the outlet of the mill. It is to be noted that, when the gas temporarily cooled to a temperature equal to or below the acid dew point is reheated (e.g., 200° C.), since an amount of $SO_3$ in the exhaust gas is small, condensation of $SO_3$ in the mill hardly occurs.

Effects of the Invention

According to the present invention, when the exhaust gas temperature is set to be not greater than the acid dew point of $SO_3$ and not lower than the water dew drop by the heat-recovery heat exchanger, $SO_3$ in the exhaust gas can be highly efficiently removed together with ash. Further, since heat recovered by the heat-recovery heat exchanger reheats the exhaust gas circulation unit using the reheating heat exchanger, low-temperature corrosion of the pipes in the exhaust gas circulation unit and others can be avoided. Furthermore, when the alkaline additive is added with concentration, which causes a reaction and is equivalent to $SO_3$ concentration in the gas at the outlet of the denitration device, it is possible to prevent corrosion of the heat-recovery heat exchanger or its pipes, the dust-collection device, and others.

Furthermore, when the water elimination device is provided on the upstream side of the reheating heat exchanger and the moisture content is reduced, the aid dew point of $SO_3$ is reduced, and hence an effect of avoiding the low-temperature corrosion of the pipes in the exhaust gas circulation unit and others can be obtained. Moreover, since a part of the gas in the exhaust gas circulation unit having the reduced $SO_3$ concentration is supplied to the mill, corrosion of the mill or a reduction in fluidity and combustibility of the pulverized coal in the outlet pipes can be avoided.

According to the invention defined in the first aspect, when the exhaust gas temperature at the inlet of the dust-collection device is set to be not greater than the acid dew point of $SO_3$ and not lower than the water dew point, $SO_3$ in the exhaust gas can be highly efficiently removed together with ash. Moreover, when the exhaust gas temperature is increased to be not lower than the acid dew point of $SO_3$ by the reheating heat exchanger of the exhaust gas circulation unit, corrosion of the pipes in the exhaust gas circulation unit can be avoided.

According to the invention defined in the second aspect, in addition to the effect of the invention defined in the first aspect, when the alkaline additive is supplied to the upstream side of the dust-collection device, the component in the ash can be prevented from acidifying.

Additionally, according to the invention defined in the third aspect, in addition to the effect of the invention defined in the second aspect, it is possible to enhance the effect for preventing corrosion of the heat-recovery heat exchanger, its pipes, the dust-collection device, and others.

Further, according to the invention defined in the fourth aspect, in addition to the effect of the invention defined in the first aspect, when the water elimination device eliminates the moisture in the exhaust gas, the reheating efficiency of the reheating heat exchanger can be improved, and the low-temperature corrosion of the pipes in the exhaust gas circulation unit can be avoided.

Furthermore, according to the invention defined in the fifth aspect, in addition to the effect of the invention defined in the first aspect, since the exhaust gas from which most of $SO_3$ has been removed is supplied to the mill, corrosion of the mill or a reduction in fluidity and combustibility of the pulverized coal in the outlet pipes of the mill can be avoided.

DETAILED DESCRIPTION OF THE PREFERRED EMBODIMENTS

Embodiments of an exhaust gas treatment device according to the present invention will now be described with reference to the drawings.

Embodiment 1

Figure 1:
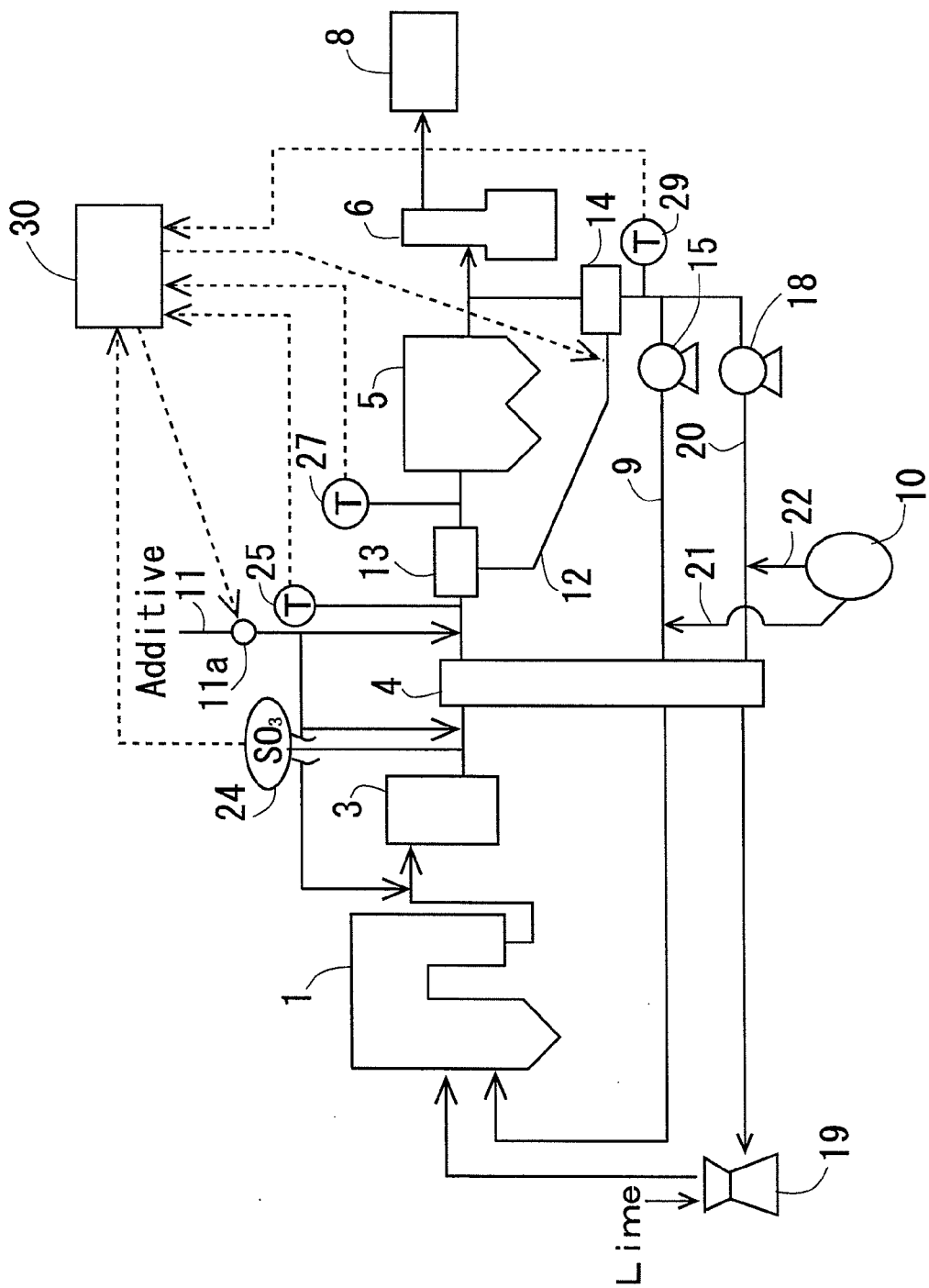
FIG. 1 is an overall block diagram of an exhaust gas treatment device according to Embodiment 1 of the present invention.

Embodiment 1 according to the present invention will now be described with reference to the drawings. FIG. 1 shows an overall configuration of an exhaust gas treatment device having a first circulation line 9 and a second circulation line 20 provided on the upstream side of a desulfurization device 6.

This exhaust gas treatment device is mainly constituted of an exhaust gas treatment unit in which a mill 19 that pulverizes coal as fuel, a boiler 1 to which the coal pulverized by the mill 19 is supplied, a denitration device 3 that treats a nitrogen oxide in an exhaust gas generated from the boiler 1, an air preheater 4 that heats combustion air used in the boiler 1 by an outlet exhaust gas of the denitration device 3, a heat-recovery heat exchanger 13 that recovers heat from the exhaust gas discharged from the air preheater 4, a dust-collection device 5 that removes smoke dust and others in the outlet exhaust gas of the heat-recovery heat exchanger 13, a desulfurization device 6 that treats a sulfur oxide in a part of the outlet exhaust gas of the dust-collection device 5, a $CO_2$ recovery device (e.g., a device that compresses, liquefies, and separates a $CO_2$ gas) 8 that recovers a carbon dioxide in the outlet exhaust gas of the desulfurization device 6, and others are sequentially arranged from the upstream side to the downstream side of an exhaust gas duct of the boiler 1.

Further, there is also provided an exhaust gas circulation unit constituted of a reheating heat exchanger 14 that reheats a part of the outlet exhaust gas of the dust-collection device 5, a first circulation line 9 through which the outlet exhaust gas of the reheating heat exchanger 14 is returned to the boiler 1 via the air preheater 4, a second circulation line (a mill supply exhaust gas line) 20 through which the outlet exhaust gas of the reheating heat exchanger 14 is returned to the mill 19 via the air preheater 4, an oxygen manufacturing device (e.g., a device that separates oxygen in air) 10 that manufactures oxygen to be supplied to the first circulation line 9 and the second circulation line 20, and others.

The boiler 1 performs oxygen combustion with respect to the coal supplied from the mill 19 to generate the exhaust gas. The oxygen used at this moment is manufactured and supplied by the oxygen manufacturing device 10. Furthermore, the oxygen is supplied from an oxygen supply pipe 21 through the first circulation line 9 and from the oxygen supply pipe 22 to the mill 19 through the second circulation line (the mill supply exhaust line) 20, for example. The supplied oxygen is heated together with a circulation gas by the air preheater 4.

Moreover, in the denitration device 3, NOx (a nitrogen oxide) contained in the exhaust gas is decomposed, and an exhaust gas temperature is then reduced in the air preheater 4 to a temperature that is not lower than an acid dew point of $SO_3$. For example, a temperature of the exhaust gas at an outlet of the denitration device 3 is reduced from 380° C. to 200 to 160° C. Here, the temperature that is not lower than the acid dew point is set in order to prevent $SO_3$ from condensing on the upstream side of the heat-recovery heat exchanger 13.

Additionally, in the heat-recovery heat exchanger 13, the exhaust gas temperature is reduced and adjusted to a temperature that is not greater than the acid dew point of $SO_3$ and not lower than a water dew point. The acid dew point at the time of oxygen combustion can be estimated from $SO_3$ concentration represented by an ordinate in FIG. 8 and a gas temperature (the acid dew point) represented by an abscissa in the same. The water dew point at the time of air combustion is approximately 50 to 55° C., and the water dew point at the time of oxygen combustion is approximately 70 to 80° C.

Figure 8:
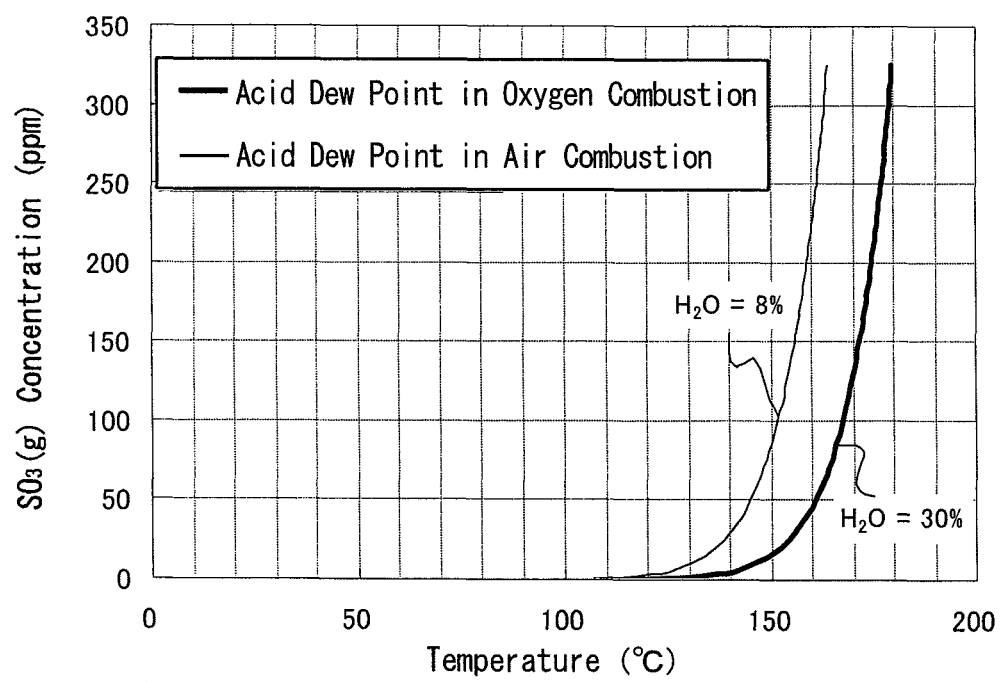
FIG. 8 is a view showing acid dew points of $SO_3$ at the time of oxygen combustion and air combustion in comparison.

It is to be noted that, although the acid dew point of $SO_3$ is dependent on the $SO_3$ concentration and moisture content in the exhaust gas as shown in FIG. 8, when regularly used coal having sulfur content of approximately 0.4 to 2.7% (weight %) is burned, the acid dew point of $SO_3$ in the oxygen combustion is approximately 162 to 178° C., and hence setting the exhaust gas temperature to at least 162 to 178° C. or below enables condensing $SO_3$ in the exhaust gas, thereby obtaining sulfuric acid mist ($H_2SO_4$).

As the air preheater 4, for example, a rotary regenerative heat exchanger is adopted. As materials of a heat-transfer element, SPCC (a cold rolled steel plate) is used on a high-temperature side, and enamel is used on a low-temperature side. Further, an exhaust gas temperature gauge 25 is installed at an outlet of the air preheater 4, and a measurement value of the exhaust gas temperature gauge 25 is input to a control device 30.

Furthermore, the heat-recovery heat exchanger 13 communicates with a heat transfer pipe of the later-described reheating heat exchanger 14 through a heat medium circulation pipe line 12 so that a heat medium is circulated between the heat-recovery heat exchanger 13 and the reheating heat exchanger 14 by a non-illustrated heat medium pump. Moreover, an exhaust gas temperature gauge 27 that measures an outlet exhaust gas temperature is disposed at an outlet of the heat-recovery heat exchanger 13, and a measurement value of the exhaust gas temperature gauge 27 is input to the control device 30. A circulating volume of the heat medium of the heat medium pump (not shown) is controlled by the control device 30, and the outlet exhaust gas temperature of the heat-recovery heat exchanger 13 is adjusted to be not greater than the acid dew point and not lower than the water dew point. As the heat medium, for example, water is used.

It is to be noted that, although not shown, the control over the exhaust gas temperature based on a flow volume of the heat medium can be likewise performed by using one or more of means for cooling the heat medium, means for heating the heat medium, and means for disposing a bypass pipe that connects an inlet and an outlet of the heat medium pipe line communicating with the heat-recovery heat exchanger 13 and adjusting a flow volume of the heat medium in the bypass pipe. It is to be noted that the control over the exhaust gas temperature based on the flow volume of the heat medium is common to other embodiments.

Moreover, an alkaline additive for inhibiting corrosion of each device or each pipe in this embodiment is supplied at the inlet of the air preheater 4 or an inlet of the heat-recovery heat exchanger 13 (an outlet of the air preheater 4) on the upstream side of the dust-collection device 5. Additionally, the alkaline additive may be supplied at an inlet or an outlet of the denitration device 3. A supply of the alkaline additive can be readily adjusted by, e.g., a valve 11a provided to a supply pipe 11. Further, although a method for supplying the alkaline additive is not restricted in particular, the additive can be supplied in the form of solid powder or an aqueous solution, and the additive can be easily supplied by spraying into an exhaust gas flue (the exhaust gas duct) using, e.g., a spray nozzle.

Further, as the alkaline additive, for example, a sodium carbonate (Na$_2$CO$_3$) is added. When the sodium carbonate (Na$_2$CO$_3$) is added, concentration of SO$_3$ is reduced as represented by the following Expression (1):

$$SO_3 + Na_2CO_3 \rightarrow Na_2SO_4 + CO_2 \qquad (1)$$

It is to be noted that, besides the sodium carbonate, a sodium hydrogen carbonate (NaHCO$_3$), a potassium carbonate (K$_2$CO$_3$), a potassium bicarbonate (KHCO$_3$), a calcium carbonate (CaCO$_3$), and others are used as the alkaline additive, but the present invention is not restricted thereto.

Furthermore, an SO$_3$ concentration meter 24 that measures SO$_3$ concentration in the exhaust gas is provided at the outlet of the denitration device 3, a supply of the alkaline additive is controlled in response to a command from the control device 30 based on a measurement value obtained by the SO$_3$ concentration meter 24, and the valve 11a provided to the supply pipe 11 is adjusted. The control device 30 that controls the supply of this alkaline additive may be provided separately from the control device 30 that determines a circulating volume of the heat medium of the heat medium pump that controls the outlet exhaust gas temperature of the heat recovery device 13, or it may also function as this control device 30 as shown in FIG. 1. This matter is common to other embodiments.

The dust-collection device 5 removes SO$_3$ together with smoke dust or salt reacted with the alkaline additive. The duct branches off, and the exhaust gas subjected to dust removal by the dust-collection device 5 is supplied to the desulfurization device 6, the first circulation line 9, and the second circulation line 20, respectively.

A part of the exhaust gas subjected to dust removal by the dust-collection device 5 is supplied to the desulfurization device 6 to remove a sulfur dioxide (SO$_2$) in the exhaust gas, and then CO$_2$ in the exhaust gas is recovered from the exhaust gas by the CO$_2$ recovery device 8. Additionally, the gas that is not supplied to the desulfurization device 6 at the outlet of the dust-collection device 5 is reheated by the reheating heat exchanger 14, and a part of the gas flows through the first circulation line 9, is pressurized by a exhaust gas circulation fan 15, then heated to approximately 350° C. by the air preheater 4, and thereafter supplied to the boiler 1. Further, the remaining gas that has passed through the reheating heat exchanger 14 is pressurized by an exhaust gas circulation fan 18 through the second circulation line 20, reheated to 200° C. by the air preheater 4, and supplied to the mill 19. The mill 19 pulverizes and dries the coal, and the coal is supplied to the boiler 1 together with the fed gas.

An exhaust gas temperature gauge 29 is provided at the outlet of the reheating heat exchanger 14, and the exhaust gas is heated in the reheating heat exchanger 14 by the heat medium circulated and supplied from the heat-recovery heat exchanger 13 through the heat medium circulation pipe line 12. Moreover, a temperate of the exhaust gas is adjusted to be not lower than the acid dew point.

According to this embodiment, when the heat-recovery heat exchanger 13 is provided on the upstream side of the dust-collection device 5 and the exhaust gas temperature at the inlet of the dust-collection device 5 is set to be not greater than the acid dew point of SO$_3$ and not lower than the water dew point by the heat-recovery heat exchanger 13, SO$_3$ in the exhaust gas condenses and adheres to ash, and SO$_3$ adhering to the ash is discharged to the outside of the system together with the ash.

Therefore, since an amount of SO$_3$ in the exhaust gas on the downstream side of the dust-collection device 5, i.e., the exhaust gas in the exhaust gas circulation unit is very small (e.g., 1 ppm or below), it is possible to avoid corrosion of the first circulation line 9 or the second circulation line 20, the exhaust gas circulation fan 15 installed in the first circulation line 9, or the exhaust gas circulation fan 18 disposed in the second circulation line 20, and others.

Additionally, an amount of SO$_3$ supplied to the desulfurization device 6 can be reduced, and corrosion in the CO$_2$ recovery device 8 can be avoided.

Further, when the alkaline additive is supplied to the upstream side of the dust-collection device 5, a reaction of SO$_3$ in the exhaust gas with an alkaline component in the ash and oxidation of the component in the ash can be avoided, namely, alkalinity of the component in the ash is maintained, and corrosion of the pipes on the downstream side of the dust-collection device 5 or the dust-collection device 5 can be thereby avoided. In this case, when the alkaline additive is supplied so as to have concentration that causes a reaction or higher concentration equivalent to SO$_3$ concentration in the gas at the outlet of the denitration device 3, an effect of avoiding corrosion of the heat-recovery heat exchanger 13, its pipes, the dust-collection device 5, and others can be enhanced.

Moreover, since SO$_3$ having such low concentration (1 ppm or below) is supplied to the mill 19, corrosion of the mille 19 or the pipes at the outlet of the mill 19 can be avoided, or a reduction in fluidity and combustibility of the pulverized coal in the pipes at the outlet of the mill 19 can be avoided. It is to be noted that, when the gas that has been temporarily cooled to a temperature which is not higher than the acid dew point is reheated (e.g., 200° C.), since an amount of SO$_3$ in the exhaust gas is small, condensation of SO$_3$ in the mill hardly occurs.

Embodiment 2

Figure 2:
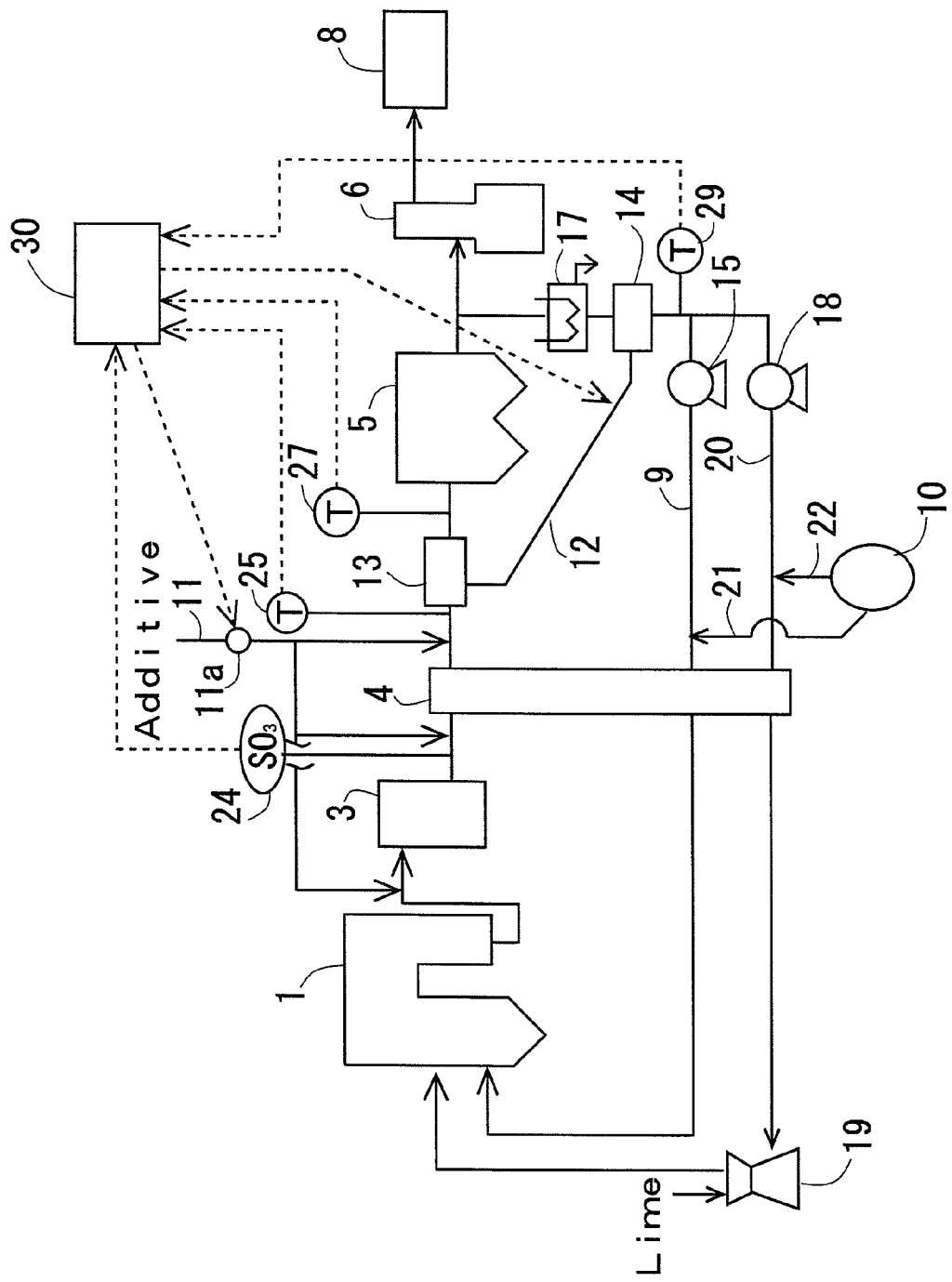
FIG. 2 is an overall block diagram of an exhaust gas treatment device according to Embodiment 2 of the present invention.

FIG. 2 shows an overall configuration of an exhaust gas treatment device according to Embodiment 2 of the present invention. The exhaust gas treatment device in FIG. 2 is different form the exhaust gas treatment device in FIG. 1 (Embodiment 1) in that a water elimination device 17 is disposed on the upstream side of a reheating heat exchanger 14.

This exhaust gas treatment device is mainly constituted of an exhaust gas treatment unit in which a mill 19 that pulverizes coal as fuel, a boiler 1 to which the coal pulverized by the mill 19 is supplied, a denitration device 3 that treats a nitrogen oxide in an exhaust gas generated from the boiler 1, an air preheater 4 that heats combustion air used in the boiler 1 by the outlet exhaust gas of the denitration device 3, a heat-recovery heat exchanger 13 that recovers heat from the exhaust gas discharged from the air preheater 4, a dust-collection device 5 that removes smoke dust and others in the outlet exhaust gas of the heat-recovery heat exchanger 13, a desulfurization device 6 that treats a sulfur oxide in a part of the outlet exhaust gas of the dust-collection device 5, a CO$_2$ recovery device 8 that recovers a carbon dioxide in the outlet exhaust gas of the desulfurization device 6, and others are sequentially arranged from the upstream side to the downstream side of an exhaust gas duct of the boiler 1.

Furthermore, there is also provided an exhaust gas circulation unit constituted of a water elimination device 17 that reduces moisture from a part of the outlet exhaust gas of the dust-collection device 5, a reheating heat exchanger 14 that reheats the outlet exhaust gas of the water elimination device 17, a first circulation line 9 through which the outlet exhaust gas of the reheating heat exchanger 14 is returned to the boiler 1 via the air preheater 4, a second circulation line 20 through which the outlet exhaust gas of the reheating heat exchanger 14 is returned to the mill 19 via the air preheater 4, an oxygen manufacturing device 10 that manufactures oxygen to be supplied to the first circulation line 9 and the second circulation line 20, and others.

Basic configurations, operations, effects, and others of the exhaust gas treatment unit and the exhaust gas circulation unit are the same as the exhaust gas treatment device depicted in FIG. 1 except a point that the water elimination device 17 is disposed.

In the exhaust gas treatment device in FIG. 1, although moisture concentration in the exhaust gas at the time of oxygen combustion is condensed to 30 to 40 weight % (a calculated value or an experimental value when the coal is burned with oxygen and the exhaust gas is circulated), adjusting the exhaust gas temperature to, e.g., a temperature at which the moisture concentration in the exhaust gas becomes 10 weight % or below by the water elimination device 17 enables enhancing the effect of avoiding corrosion of the first circulation line 9 or the second circulation line 20 and the exhaust gas circulation fan 15 disposed in the first circulation line 9 or the exhaust gas circulation fan 18 disposed in the second circulation line 20. Additionally, when the water elimination device 17 is provided between the dust-collection device 5 and the desulfurization device 6, an amount of $SO_3$ supplied to the desulfurization device 6 can be reduced, and corrosion in the $CO_2$ recovery device 8 can be also avoided. The water elimination device 17 cools the exhaust gas and condenses water to eliminate water. For example, when the exhaust gas temperature is reduced to approximately 48° C. at the time of oxygen combustion, the water concentration becomes approximately 10 weight %.

In case of the oxygen combustion, the moisture concentration is higher than that in the air combustion and, when an amount of moisture in the exhaust gas is large at the time of reheating the exhaust gas by the reheating heat exchanger 14, efficiency of reheating the exhaust gas temperature to an acid dew point or a higher temperature by latent heat of water is deteriorated.

However, according to this embodiment, when the water elimination device 17 is disposed on the upstream side of the reheating heat exchanger 14 in the exhaust gas circulation unit, the moisture concentration in the exhaust gas is reduced, and hence the reheating efficiency of the reheating heat exchanger 14 can be improved. Further, when the moisture concentration in the exhaust gas is reduced, since the acid dew point of $SO_3$ is lowered, it is possible to enhance the effect of avoiding condensation of $SO_3$ in the first circulation line 9 or the second circulation line 20 in the exhaust gas circulation unit, the exhaust gas circulation fan 15 disposed in the first circulation line 9, the exhaust gas circulation fan 18 disposed in the second circulation line 20, and the mill 19, thereby avoiding low-temperature corrosion.

Embodiment 3

Figure 3:
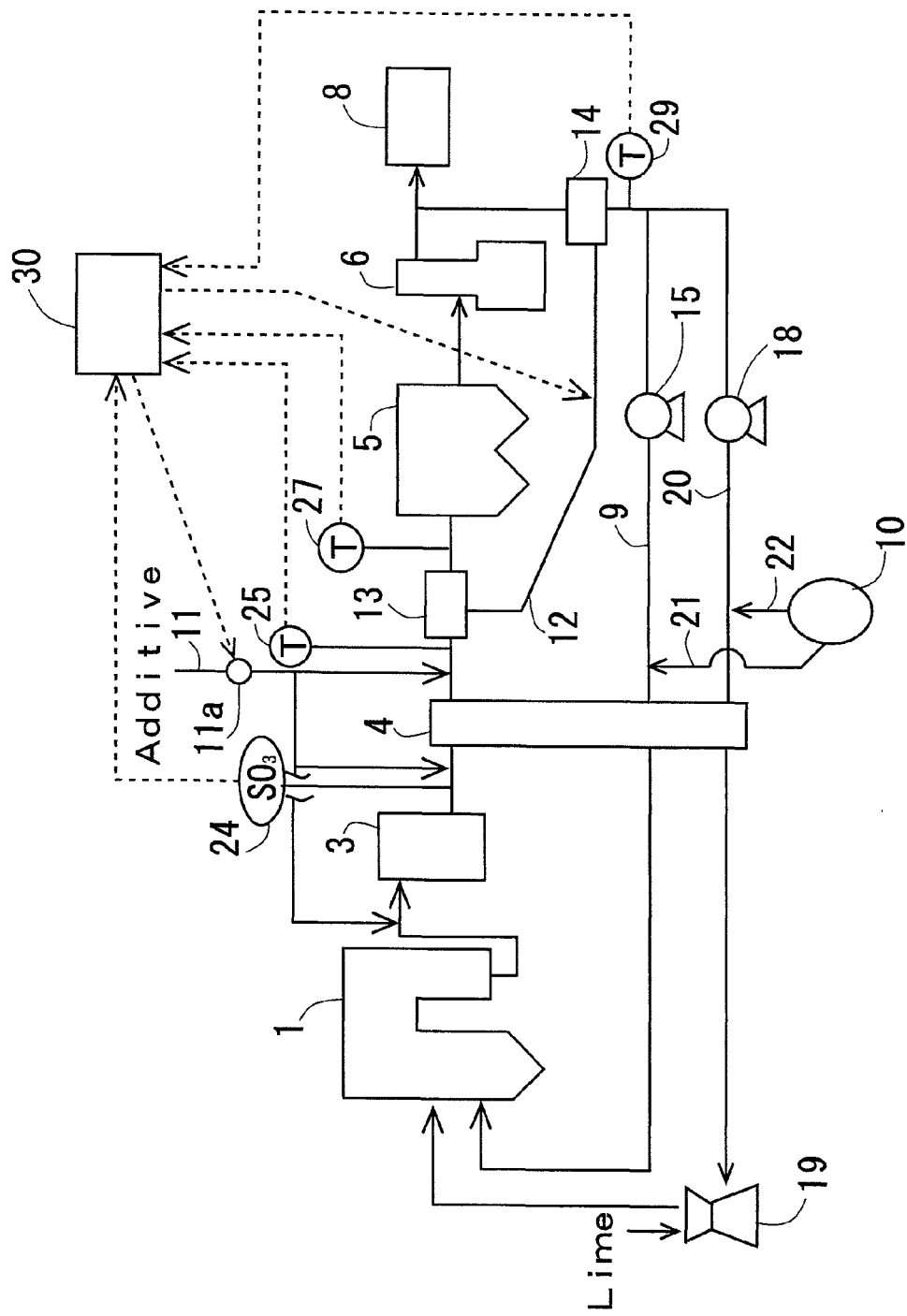
FIG. 3 is an overall block diagram of an exhaust gas treatment device according to Embodiment 3 of the present invention.

FIG. 3 shows an overall configuration of an exhaust gas treatment device according to Embodiment 3 of the present invention. The exhaust gas treatment device in FIG. 3 is different from the exhaust gas treatment device in FIG. 1 (Embodiment 1) that a first circulation line 9 and a second circulation line 20 are disposed on the downstream side of a desulfurization device 6.

This exhaust gas treatment device is mainly constituted of an exhaust gas treatment unit in which a mill 19 that pulverizes coal as fuel, a boiler 1 to which the coal pulverized by the mill 19 is supplied, a denitration device 3 that treats a nitrogen oxide in an exhaust gas generated from the boiler 1, an air preheater 4 that heats combustion air used in the boiler 1 by the outlet exhaust gas of the denitration device 3, a heat-recovery heat exchanger 13 that recovers heat from the exhaust gas discharged from the air preheater 4, a dust-collection device 5 that removes smoke dust and others in the outlet exhaust gas of the heat-recovery heat exchanger 13, a desulfurization device 6 that treats a sulfur oxide in the outlet exhaust gas of the dust-collection device 5, a $CO_2$ recovery device 8 that recovers a carbon dioxide from a part of the outlet exhaust gas of the desulfurization device 6, and others are sequentially arranged from the upstream side to the downstream side of an exhaust gas duct of the boiler 1.

Furthermore, there is also provided an exhaust gas circulation unit constituted of a reheating heat exchanger 14 that reheats a part of the outlet exhaust gas of the desulfurization device 6, a first circulation line 9 through which the outlet exhaust gas of the reheating heat exchanger 14 is returned to the boiler 1 via the air preheater 4, a second circulation line 20 through which the outlet exhaust gas of the reheating heat exchanger 14 is returned to the mill 19 via the air preheater 4, an oxygen manufacturing device 10 that manufactures oxygen to be supplied to the first circulation line 9 and the second circulation line 20, and others.

The boiler 1 performs oxygen combustion with respect to the coal supplied from the mill 19 to generate the exhaust gas. Oxygen used at this moment is manufactured and supplied by an oxygen manufacturing device 10.

Moreover, oxygen is supplied from an oxygen supply pipe 21 through the first circulation line 9 and from an oxygen supply pipe 22 to the mill 19 through the second circulation line 20. The supplied oxygen is heated together with a circulation gas by the air preheater 4.

Additionally, the denitration device 3 decomposes NOx (a nitrogen oxide) contained in the exhaust gas, and then an exhaust gas temperature is reduced to a temperature which is not lower than the acid dew point by the air preheater 4. An exhaust gas temperature gauge 25 is disposed at an outlet of the air preheater 4, and a measurement value of the exhaust gas temperature gauge 25 is input to a control device 30.

Further, the heat-recovery heat exchanger 13 adjusts the exhaust gas temperature to a temperature that is not greater than the acid dew point of $SO_3$ and not lower than a water dew point. Like Embodiment 1, the acid dew point at the time of oxygen combustion can be estimated from $SO_3$ concentration represented by an ordinate in FIG. 8 and a gas temperature (the acid dew point) represented by an abscissa in the same. The water dew point at the time of air combustion is approximately 50 to 55° C., and the water dew point at the time of oxygen combustion is approximately 70 to 80° C.

It is to be noted that, although the acid dew point of $SO_3$ is dependent on $SO_3$ concentration and moisture content in the exhaust gas as shown in FIG. 8, when regularly used coal having sulfur content of approximately 0.4 to 2.7% (weight %) is burned, the acid dew point of $SO_3$ in the oxygen combustion is approximately 162 to 178° C., and hence setting the exhaust gas temperature to at least 162 to 178° C. or below enables condensing $SO_3$ in the exhaust gas, thereby obtaining sulfuric acid mist ($H_2SO_4$).

Furthermore, a heat transfer pipe of the heat-recovery heat exchanger 13 communicates with that of the reheating heat exchanger 14 through a heat medium circulation pipe line 12 so that a heat medium is circulated between the heat-recovery heat exchanger 13 and the reheating heat exchanger 14 by a non-illustrated heat medium pump.

Moreover, an exhaust gas temperature gauge 27 that measures an outlet exhaust gas temperature is disposed at an outlet of the heat-recovery heat exchanger 13, and a measurement value of the exhaust gas temperature gauge 27 is input to the control device 30. A circulating volume of the heat medium of the heat medium pump is controlled by the control device 30, and the outlet exhaust gas temperature of the heat-recovery heat exchanger 13 is adjusted to be not greater than the acid dew point and not lower than the water dew point. As the heat medium, for example, water is used.

Additionally, an alkaline additive for inhibiting corrosion of each device or each pipe in this embodiment is supplied at the inlet of the air preheater 4 or an inlet of the heat-recovery heat exchanger 13 (an outlet of the air preheater 4) on the upstream side of the dust-collection device 5. Additionally, the alkaline additive may be supplied at an inlet or an outlet of the denitration device 3. A supply of the alkaline additive can be readily adjusted by, e.g., a valve 11a provided to a supply pipe 11. Further, an $SO_3$ concentration meter 24 that measures $SO_3$ concentration in the exhaust gas is provided at the outlet of the denitration device 3, a supply of the alkaline additive is controlled in response to a command from the control device 30 based on a measurement value obtained by the $SO_3$ concentration meter 24, and the valve 11a provided to the supply pipe 11 is adjusted. The dust-collection device 5 removes $SO_3$ together with smoke dust or salt reacted with the alkaline additive. The exhaust gas subjected to dust removal by the dust-collection device 5 is supplied to the desulfurization device 6, whereby a sulfur dioxide ($SO_2$) in the exhaust gas is removed.

Furthermore, the duct branches off, and the exhaust gas subjected to desulfurization by the desulfurization device 6 is supplied to the $CO_2$ recovery device 8, the first circulation line 9, and the second circulation line 20, respectively. Moreover, the $CO_2$ recovery device 8 recovers $CO_2$ in the exhaust gas.

Moreover, the gas that is not supplied to the $CO_2$ recovery device 8 at the outlet of the desulfurization device 6 is reheated by the reheating heat exchanger 14, and a part of the gas passes through the first circulation line 9, is pressurized by the exhaust gas circulation fan 15, then further heated to approximately 350° C. by the air preheater 4, and supplied to the boiler 1. Additionally, the remaining gas that has passed through the reheating heat exchanger 14 passes through the second circulation line 20, is pressurized by the exhaust gas circulation fan 18, reheated to 200° C. by the air preheater 4, and then supplied to the mill 19. The mill 19 dries and pulverizes the coal, and the coal is supplied to the boiler 1 together with the supplied gas.

An exhaust gas temperature gauge 29 is provided at the outlet of the reheating heat exchanger 14, and the reheating heat exchanger 14 heats the exhaust gas using the heat medium circulated and supplied from the heat-recovery heat exchanger 13 through the heat medium circulation pipe line 12. Further, a temperature of the exhaust gas is adjusted to be not lower than the acid dew point.

Basic configurations, operations, effects, and others of the exhaust gas treatment unit and the exhaust gas circulation unit are the same as those in the exhaust gas treatment device depicted in FIG. 1 except that the exhaust gas circulation unit including the first circulation line 9, the second circulation line 20, and others is provided from the outlet of the desulfurization device 6 rather than the outlet of the dust-collection device 5.

That is, when the exhaust gas temperature at the inlet of the dust-collection device 5 is set to be not greater than the acid dew point of $SO_3$ and not lower than the water dew point by the heat-recovery heat exchanger 13 provided on the upstream side of the dust-collection device 5, $SO_3$ in the exhaust gas condenses and adheres to ash, and $SO_3$ adhering to the ash is discharged to the outside of the system by the dust-collection device 5 together with the ash.

Therefore, since an amount of $SO_3$ in the exhaust gas on the downstream side of the dust-collection device 5, i.e., the exhaust gas in the exhaust gas circulation unit is very small (e.g., 1 ppm or below), it is possible to avoid corrosion of the first circulation line 9, the second circulation line 20, the exhaust gas circulation fan 15 disposed in the first circulation line 9, the exhaust gas circulation fan 18 disposed in the second circulation line 20, and others. Furthermore, an amount of $SO_3$ supplied to the desulfurization device 6 can be reduced, and corrosion in the $CO_2$ recovery device 8 can be avoided.

Further, supplying the alkaline additive to the upstream side of the dust-collection device 5 makes it possible to prevent $SO_3$ in the exhaust gas from reacting with an alkaline component in ash and preventing the component in the ash from acidifying, namely, maintaining alkalinity of the component in the ash makes it possible to avoid corrosion of the pipes on the downstream side of the dust-collection device 5 and the dust-collection device 5. In this case, when the alkaline additive is supplied so as to have concentration that causes a reaction or higher concentration equivalent to $SO_3$ concentration in the gas at the outlet of the denitration device 3, it is possible to enhance an effect of avoiding corrosion of the heat-recovery heat exchanger 13, its pipes, the dust-collection device 5, and others.

Furthermore, since $SO_3$ having such a low concentration (1 ppm or below) is supplied to the mill 19, corrosion of the pipes at the outlet of the mill 19 can be avoided, and a reduction in fluidity and combustibility of pulverized coal in the outlet pipes of the mill 19 can be prevented. It is to be noted that, when the gas that has been temporarily cooled to a temperature that is not greater than the acid dew point is reheated (e.g., 200° C.), since an amount of $SO_3$ in the exhaust gas is small, condensation of $SO_3$ hardly occurs in the mill 19.

Moreover, since the inside of the boiler 1 has a high temperature (e.g., approximately 1200° C.), $SO_2$ in the exhaust gas does not turn to $SO_3$, but a part of $SO_2$ is converted into $SO_3$ when the exhaust gas temperature is lowered to 800° C. or below. In the exhaust gas treatment device shown in FIG. 3, since all of the outlet exhaust gas of the dust-collection device 5 is supplied to the desulfurization device 6, a total amount of the exhaust gas at the outlet of the boiler 1 is treated by the desulfurization device 6. Therefore, as compared with the exhaust gas treatment device shown in FIG. 1, although a load on the desulfurization device 6 is large, but concentration of the $SO_2$ gas supplied to the first circulation line 9 and the second circulation line 20 can be reduced, and hence the $SO_2$ concentration in the exhaust gas passing through the exhaust gas circulation unit can be prevented from increasing.

In this manner, since the exhaust gas treatment device shown in FIG. 3 can suppress occurrence of generation of $SO_3$ by removal of $SO_2$ in the exhaust gas, corrosion of the devices or the pipes in the entire exhaust gas treatment system can be further avoided as compared with the exhaust gas treatment device shown in FIG. 1.

Embodiment 4

Figure 4:
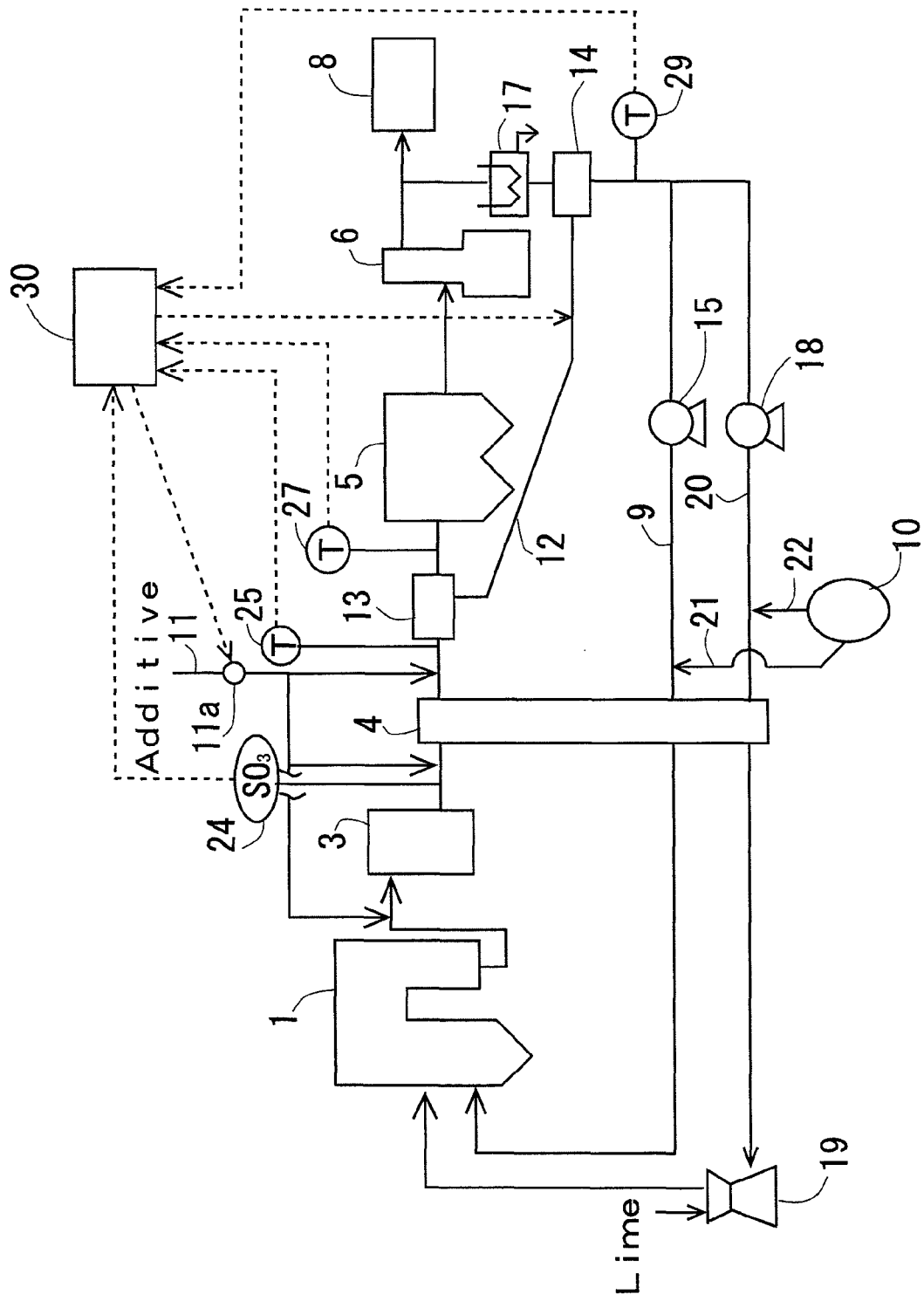
FIG. 4 is an overall block diagram of an exhaust gas treatment device according to Embodiment 4 of the present invention.

FIG. 4 shows an entire configuration of an exhaust gas treatment device according to Embodiment 4 of the present invention. The exhaust gas treatment device shown in FIG. 4 is different from the exhaust gas treatment device in FIG. 2 (Embodiment 2) in that a first circulation line 9 and a second circulation line 20 are disposed on the downstream side of a desulfurization device 6. Moreover, the exhaust gas treatment device in FIG. 4 is different from the exhaust gas treatment device in FIG. 3 (Embodiment 3) in that a water elimination device 17 is disposed on the upstream side of a reheating heat exchanger 14.

This exhaust gas treatment device is mainly constituted of an exhaust gas treatment unit in which a mill 19 that pulverizes coal as fuel, a boiler 1 to which the coal pulverized by the mill 19 is supplied, a denitration device 3 that treats a nitrogen oxide in an exhaust gas generated from the boiler 1, an air preheater 4 that heats combustion air used in the boiler 1 with an outlet exhaust gas of the denitration device 3, a heat-recovery heat exchanger 13 that recovers heat from the exhaust gas discharged from the air preheater 4, a dust-collection device 5 that removes smoke dust and others in the exhaust gas at an outlet of the heat-recovery heat exchanger 13, a desulfurization device 6 that treats a sulfur oxide in the outlet exhaust gas of the dust-collection device 5, a $CO_2$ recovery device 8 that recovers a carbon dioxide from a part of the outlet exhaust gas of the desulfurization device 6, and others are sequentially arranged from the upstream side to the downstream side of an exhaust gas duct of the boiler 1.

Additionally, there is also provided an exhaust gas circulation unit constituted of a water elimination device 17 that reduces moisture from a part of the outlet exhaust gas of the desulfurization device 6, a reheating heat exchanger 14 that reheats the outlet exhaust gas of the water elimination device 17, a first circulation line 9 through which the outlet exhaust gas of the reheating heat exchanger 14 is returned to the boiler 1 via the air preheater 4, a second circulation line 20 through which the outlet exhaust gas of the reheating heat exchanger 14 is returned to the mill 19 via the air preheater 4, an oxygen manufacturing device 10 that manufactures oxygen to be supplied to the first circulation line 9 and the second circulation line 20, and others.

Basic configurations, operations, effects, and others of the exhaust gas treatment unit and the exhaust gas circulation unit are the same as the exhaust gas treatment device depicted in FIG. 3 except that the water elimination device 17 is disposed.

In the exhaust gas treatment device shown in FIG. 3, the reheating heat exchanger 14 must also reheat an absorbing liquid that has scattered from the desulfurization device 6. However, since latent heat of water is high, heat efficiency is poor for reincreasing the exhaust gas temperature to the acid dew point or a higher temperature. Therefore, when the water elimination device 17 is used on the upstream side of the reheating heat exchanger 14 to eliminate moisture in the exhaust gas, reheating efficiency of the reheating heat exchanger 14 can be improved.

Further, when moisture concentration in the exhaust gas is reduced, since the acid dew point of $SO_3$ is lowered, it is possible to enhance an effect of avoiding condensation of $SO_3$ in the first circulation line 9 or the second circulation line 20 in the exhaust gas circulation unit, an exhaust gas circulation fan 15 disposed in the first circulation line 9, an exhaust gas circulation fan 18 disposed in the second circulation line 20, and the mill 19 and improve the effect of avoiding low-temperature corrosion.

Embodiment 5

Figure 5:
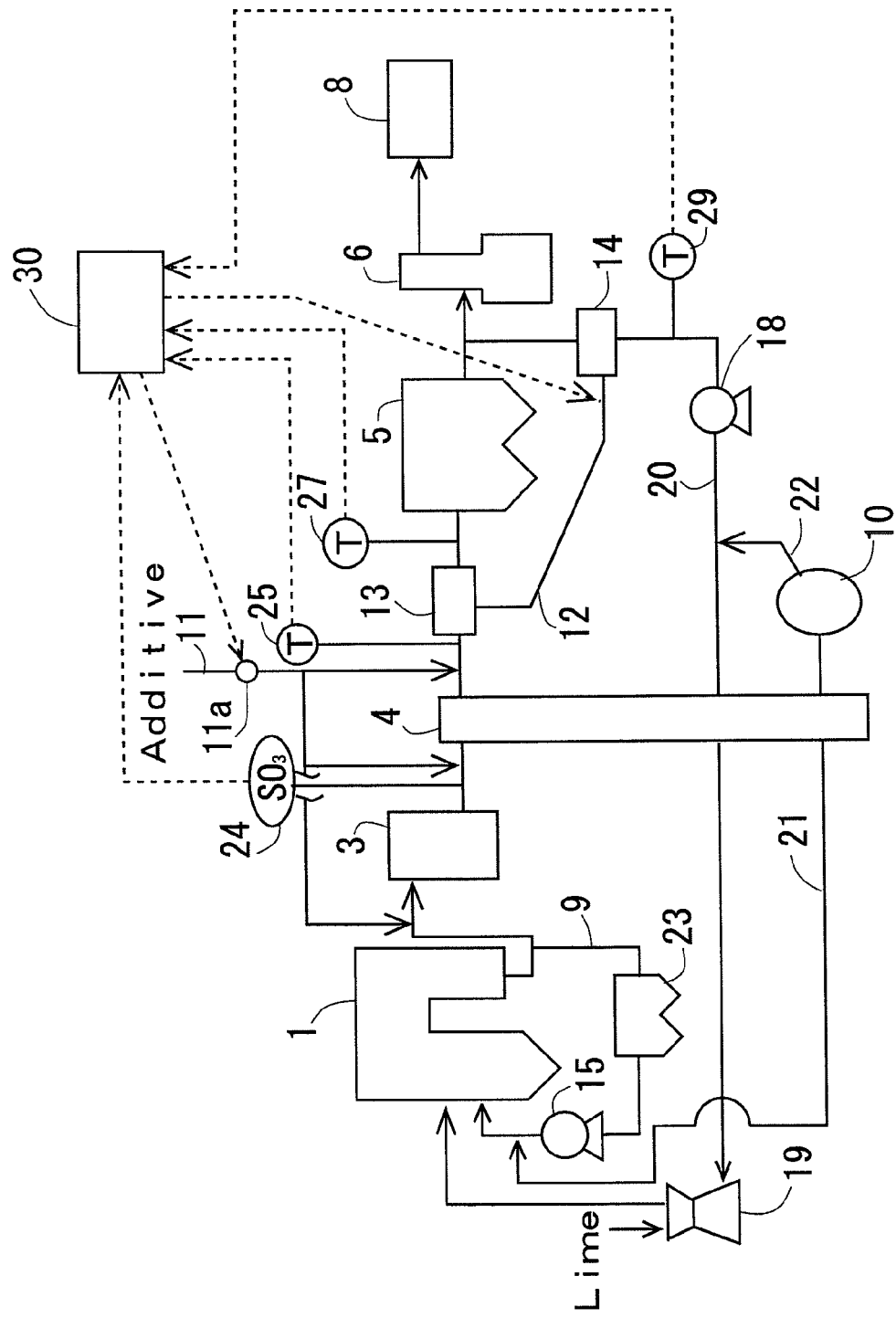
FIG. 5 is an overall block diagram of an exhaust gas treatment device according to Embodiment 5 of the present invention.
Figure 6:
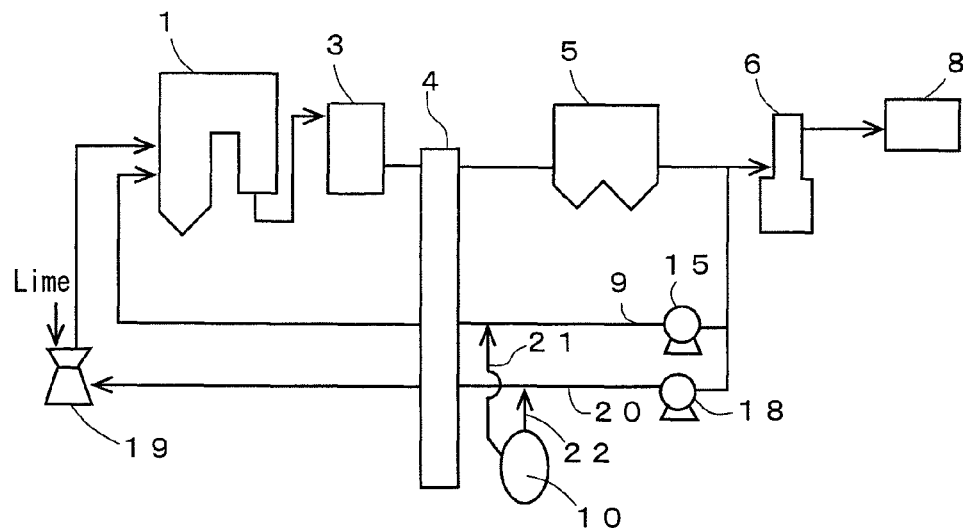
FIG. 6 is an overall block diagram of an exhaust gas treatment device having an exhaust gas circulation unit provided on the upstream side of a desulfurization device according to the convention technology.
Figure 7:
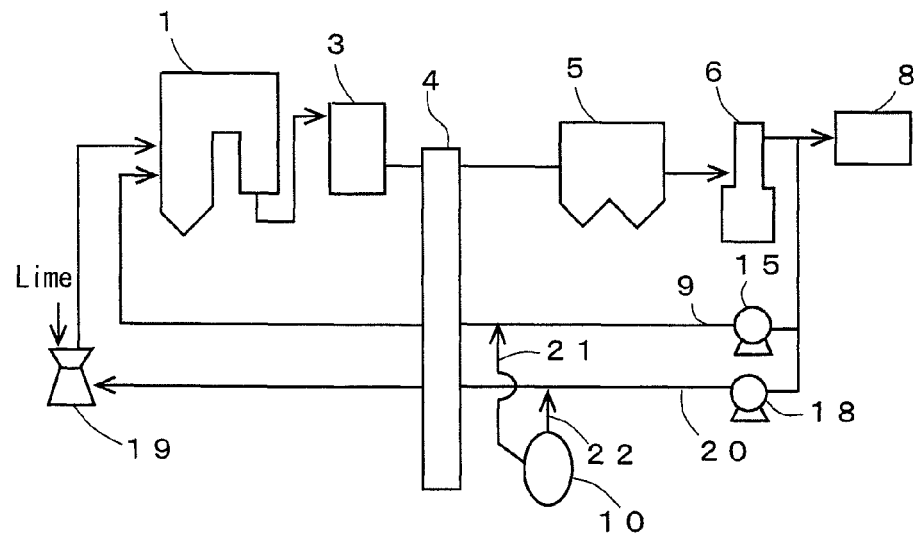
FIG. 7 is an overall block diagram of an exhaust gas treatment device having an exhaust gas circulation unit provided on the downstream side of a desulfurization device according to the conventional technology.

FIG. 5 shows an entire configuration of an exhaust gas treatment device according to Embodiment 5 of the present invention. As an overall configuration of the exhaust gas treatment device in FIG. 5, a first circulation line 9 in the exhaust gas treatment device in FIG. 1 is provided at an outlet of a boiler 1, and a second dust-collection device 23 is disposed in the first circulation line 9.

This exhaust gas treatment device is mainly constituted of an exhaust gas treatment unit in which a mill 19 that pulverizes coal as fuel, the boiler 1 to which the coal pulverized by the mill 19 is supplied, a denitration device 3 that treats a nitrogen oxide in an exhaust gas generated from the boiler 1, an air preheater 4 that heats combustion air used in the boiler 1 with an outlet exhaust gas of the denitration device 3, a heat-recovery heat exchanger 13 that recovers heat from the exhaust gas discharged from the air preheater 4, a dust-collection device 5 that removes smoke dust and others in the exhaust gas at an outlet of the heat-recovery heat exchanger 13, a desulfurization device 6 that treats a sulfur oxide in a part of the outlet exhaust gas of the dust-collection device 5, a $CO_2$ recovery device 8 that recovers a carbon dioxide in the outlet exhaust gas of the desulfurization device 6, and others are sequentially arranged from the upstream side to the downstream side of an exhaust gas duct of the boiler 1.

Further, there is also provided an exhaust gas circulation unit constituted of a first circulation line 9 for returning to the boiler 1 from an outlet of the boiler 1, a second dust-collection device 23 that removes smoke dust and others in the exhaust gas in the first circulation line 9, a reheating heat exchanger 14 that reheats a part of the outlet exhaust gas of the dust-collection device 5, a second circulation line 20 through which the outlet exhaust gas of the reheating heat exchanger 14 is returned to the mill 19 via the air preheater 4, an oxygen manufacturing device 10 that manufactures oxygen to be supplied to the first circulation line 9 and the second circulation line 20, and others.

The boiler 1 performs oxygen combustion with respect to the coal supplied from the mill 19 to generate the exhaust gas. Furthermore, according to this embodiment, a part of the exhaust gas at the outlet of the boiler 1 is supplied from the first circulation line 9 to the second dust collection device 23 and removes smoke dust and others in the exhaust gas. Since a temperature of the exhaust gas supplied to the second dust-collection device 23 is as relatively high as 200° C. or above, if the second dust-collection device 23 is, e.g., a bug filter, a heat-resistance countermeasure such as use of filter cloth made of ceramics or a metal is required.

Moreover, oxygen manufactured by the oxygen manufacturing device 10 is supplied to the first circulation line 9.

The exhaust gas at the outlet of the boiler 1 that is not supplied to the second dust-collection device 23 in the first circulation line 9 is supplied to the denitration device 3, NOx (a nitrogen oxide) contained in the exhaust gas is decomposed, and then the exhaust gas temperature is lowered to a temperature that is not lower than an acid dew point of $SO_3$ in the air preheater 4. Additionally, in the heat-recovery heat exchanger 13, the exhaust gas temperature is lowered and adjusted to a temperature that is not greater than the acid dew point of $SO_3$ and not lower than a water dew point. Like Embodiment 1, the acid dew point at the time of oxygen combustion can be estimated from $SO_3$ concentration represented by the ordinate in FIG. 8 and a gas temperature (the acid dew point) represented by the abscissa in the same. The water dew point at the time of air combustion is approximately 50 to 55° C., and the water dew point at the time of oxygen combustion is approximately 70 to 80° C.

It is to be noted that, although the acid dew point of $SO_3$ is dependent on the $SO_3$ concentration and moisture content in the exhaust gas as shown in FIG. 8, when regularly used coal having sulfur content of approximately 0.4 to 2.7% (weight %) is burned, the acid dew point of $SO_3$ in the oxygen combustion is approximately 162 to 178° C., and hence setting the exhaust gas temperature to at least 162 to 178° C. or below enables condensing $SO_3$ in the exhaust gas, thereby obtaining sulfuric acid mist ($H_2SO_4$).

Additionally, an alkaline additive for inhibiting corrosion of each device or each pipe according to the present invention is supplied at the inlet of the air preheater 4 or an inlet of the heat-recovery heat exchanger 13 (an outlet of the air preheater 4) on the upstream side of the dust-collection device 5. Further, the alkaline additive may be supplied at an inlet or an outlet of the denitration device 3. A supply of the alkaline additive is controlled by a command from a control device 30 based on a measurement value of an $SO_3$ concentration meter 24, and a valve 11a provided to a supply pipe 11 is adjusted. The exhaust gas at an outlet of the heat-recovery heat exchanger 13 is supplied to the dust-collection device 5, and $SO_3$ is removed together with smoke dust or salt reacted with the alkaline additive in the dust-collection device 5. When a part of the exhaust gas subjected to dust removal by the dust-collection device 5 is supplied to the desulfurization device 6, a sulfur dioxide ($SO_2$) in the exhaust gas is removed, and $CO_2$ in the exhaust gas is recovered by the $CO_2$ recovery device 8.

Furthermore, the gas that is not supplied to the desulfurization device 6 at the outlet of the dust-collection device 5 is reheated by the reheating heat exchanger 14, passes through the second circulation line 20, is pressurized by an exhaust gas circulation fan 18, reheated to 200° C. by the air preheater 4, and then supplied to the mill 19. The coal is dried and pulverized in the mill 19, and the coal is supplied to the boiler 1 together with the fed gas.

An exhaust gas temperature gauge 29 is provided at an outlet of the reheating heat exchanger 14, and the exhaust gas is heated in the reheating heat exchanger 14 using a heat medium circulated and supplied from the heat-recovery heat exchanger 13 through a heat medium circulation pipe line 12. Moreover, a temperature of the exhaust gas is adjusted to be not lower than the acid dew point.

According to this embodiment, since a part of the exhaust gas at the outlet of the boiler 1 is returned to the boiler 1, an amount of the exhaust gas supplied to the denitration device 3 or the dust-collection device 5 is approximately ⅓ of an amount of the gas in the entire system of the exhaust gas treatment device. Therefore, as compared with the exhaust gas treatment device depicted in FIG. 1, sizes of the denitration device 3 or the dust-collection device 5 can be reduced, and the exhaust gas treatment device itself can be downsized.

Moreover, when the exhaust gas temperature at the inlet of the dust-collection device 5 is adjusted to be not greater than the acid dew point of $SO_3$ and not lower than the water dew point using the heat-recovery heat exchanger 13 provided on the upstream side of the dust-collection device 5, $SO_3$ in the exhaust gas condenses and adheres to the ash, and $SO_3$ adhering to the ash is discharged to the outside of the system by the dust-collection device 5 together with the ash.

Therefore, since an amount of $SO_3$ in the exhaust gas on the downstream side of the dust-collection device 5 is very small (e.g., 1 ppm or below), it is possible to avoid corrosion of the second circulation line 20, the exhaust gas circulation fan 18 disposed in the second circulation line 20, and others. Additionally, an amount of $SO_3$ supplied to the desulfurization device 6 can be reduced, and corrosion in the $CO_2$ recovery device 8 can be avoided.

Further, supplying the alkaline additive to the upstream side of the dust-collection device 5 makes it possible to prevent $SO_3$ in the exhaust gas from reacting with an alkaline component and preventing the component in the ash from acidifying, namely, maintaining alkalinity of the component in the ash makes it possible to avoid corrosion of the pipes on the downstream side of the dust-collection device 5 or the dust-collection device 5. In this case, when the alkaline additive is supplied so as to have concentration that causes a reaction or higher concentration equivalent to $SO_3$ concentration in the gas at the outlet of the denitration device 3, the effect of avoiding corrosion of the heat-recovery heat exchanger 13, its pipes, the dust-collection device 5, and others can be enhanced.

Moreover, since $SO_3$ having low concentration (1 ppm or below) is supplied to the mill 19 in this manner, corrosion of the mill 19 or the pipes at the outlet of the mill 19 can be avoided, and a reduction in fluidity and combustibility of pulverized coal in the pipes at the outlet of the mill 19 can be prevented.

In addition, as shown in FIG. 3 and FIG. 4, it is needless to say that the second circulation line 20 may be disposed on the downstream side of the denitration device 6 and the water elimination device 17 may be provided on the upstream side of the reheating heat exchanger 14.

INDUSTRIAL APPLICABILITY

According to the present invention, although a sulfur trioxide ($SO_3$) can be efficiently removed in the dust-collection unit of the flue gas treatment device in the oxygen combustion system, the present invention is available as the technology that efficiently removes the sulfur trioxide in not only the oxygen combustion system but also the regular air combustion system.

DESCRIPTION OF REFERENCE NUMERALS 1 boiler
3 denitration device
4 air preheater
5 dust-collection device
6 wet flue-gas desulfurization device
8 $CO_2$ recovery device
9 first circulation line
10 oxygen manufacturing device
11 alkaline additive supply pipe
11a additive supply adjusting valve
12 heat medium circulation pipe line
13 heat-recovery heat exchanger
14 reheating heat exchanger
15, 18 exhaust gas circulation fan
17 water elimination device
19 mill
20 second circulation line (mill supply exhaust gas line)
21, 22 oxygen supply pipe
23 second dust-collection device
24 $SO_3$ concentration meter
25, 27, 29 exhaust gas temperature gauge
30 control device

What is claimed is:
1. An exhaust gas treatment device for an oxygen combustion system, the exhaust gas treatment device comprising:

an exhaust gas treatment unit in which a denitration device that denitrates a nitrogen oxide in an exhaust gas generated from an oxygen combustion boiler using coal as fuel, an air preheater that preheats combustion air of the oxygen combustion boiler with the exhaust gas at an outlet of the denitration device; a dust-collection device that collects smoke dust in the exhaust gas at an outlet of the air preheater, a desulfurization device that desulfurs a sulfur oxide in the exhaust gas at an outlet of the dust-collection device, and a carbon dioxide recovery device that recovers a carbon dioxide in the exhaust gas at an outlet of the desulfurization device are sequentially arranged from the upstream side to the downstream side of an exhaust gas duct; and an exhaust gas circulation unit comprising an exhaust-gas circulation line which branches off from the exhaust gas duct at the outlet of the dust-collection device or the outlet of the desulfurization device and through which the exhaust gas is preheated by the air preheater and returned to the oxygen combustion boiler as the combustion air, wherein a heat-recovery heat exchanger that recovers heat from the exhaust gas at the outlet of the air preheater and comprises a first heat transfer pipe that recovers the heat of the exhaust gas into a heat medium is provided to the exhaust gas duct between the air preheater and the dust-collection device, and a reheating heat exchanger, comprising a second heat transfer pipe that heats the exhaust gas in the exhaust-gas circulation line by the heat medium supplied from the heat-recovery exchanger is provided to the exhaust-gas circulation line in the vicinity of a branch of the exhaust gas circulation unit, and an exhaust gas circulation fan provided to the exhaust-gas circulation line, wherein the reheating heat exchanger is provided between the branch of the exhaust gas circulation unit and the exhaust gas circulation fan, the exhaust gas treatment device further comprises:

a heat medium circulation line communicatively connecting the first heat transfer pipe and the second heat transfer pipe such that the heat medium circulate in interiors of the first and second heat transfer pipes;

a controller that controls an exhaust gas temperature at an inlet of the dust-collection device to be not greater than an acid dew point of SO3 and not lower than a water dew point, the controller controlling an exhaust gas temperature in the exhaust-gas circulation line, at an outlet of the reheating heat exchanger, to be not lower than the acid dew temperature of SO3; and an adjusting unit that is controlled by the controller to adjust at least one among a circulation amount of the heat medium flowing through the heat medium circulation line, a heat medium heating amount, and a heat medium cooling amount.

2. The exhaust gas treatment device for an oxygen combustion system according to claim 1, wherein an alkaline additive supplier that supplies an alkaline additive into the exhaust gas is provided to the exhaust gas duct at the inlet or the outlet of the denitration device on the upstream side of the heat-recovery heat exchanger.

3. The exhaust gas treatment device for an oxygen combustion system according to claim 2, wherein a $SO_3$ concentration measurer that measures $SO_3$ concentration in the exhaust gas is provided at the outlet of the denitration device, an additive supply adjuster that adjusts a supply of the additive is provided to the alkaline additive supplier, and a control device is provided which controls the additive supply adjuster is provided in such a manner that the supply of the additive from the alkaline additive supplier has a concentration that causes a reaction or higher concentration equivalent to $SO_3$ concentration measured by the $SO_3$ concentration measurer.

4. The exhaust gas treatment device for an oxygen combustion system according to claim 1, wherein a water elimination device that eliminates moisture in the exhaust gas is provided on the upstream side of the reheating heat exchanger in the vicinity of a branch of the exhaust gas circulation unit.

5. The exhaust gas treatment device for an oxygen combustion system according to claim 1, wherein a mill that supplies coal to the oxygen combustion boiler is provided, and a mill supply exhaust gas line that supplies the exhaust gas on the downstream side of the reheating heat exchanger in the exhaust gas circulation unit to the mill is provided.

* * * * *